May 7, 1963  A. L. WHEAR  3,088,342
CHIP BREAKING COUPLING FOR DRILL SPINDLES
Filed May 31, 1960  2 Sheets-Sheet 1
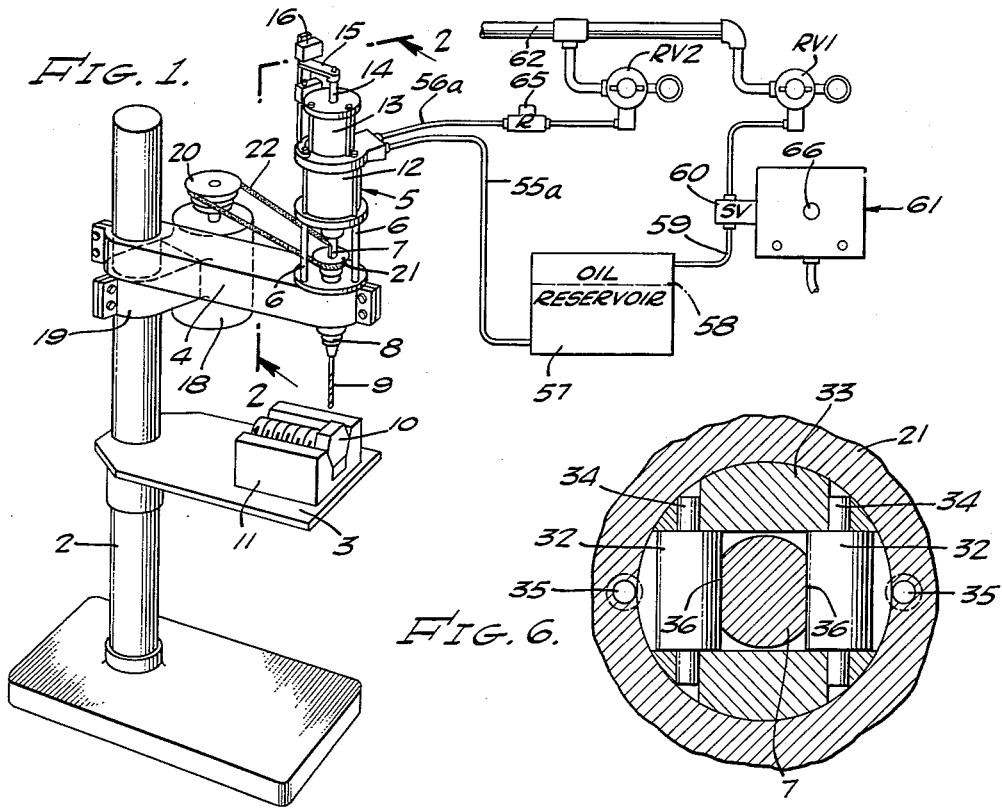
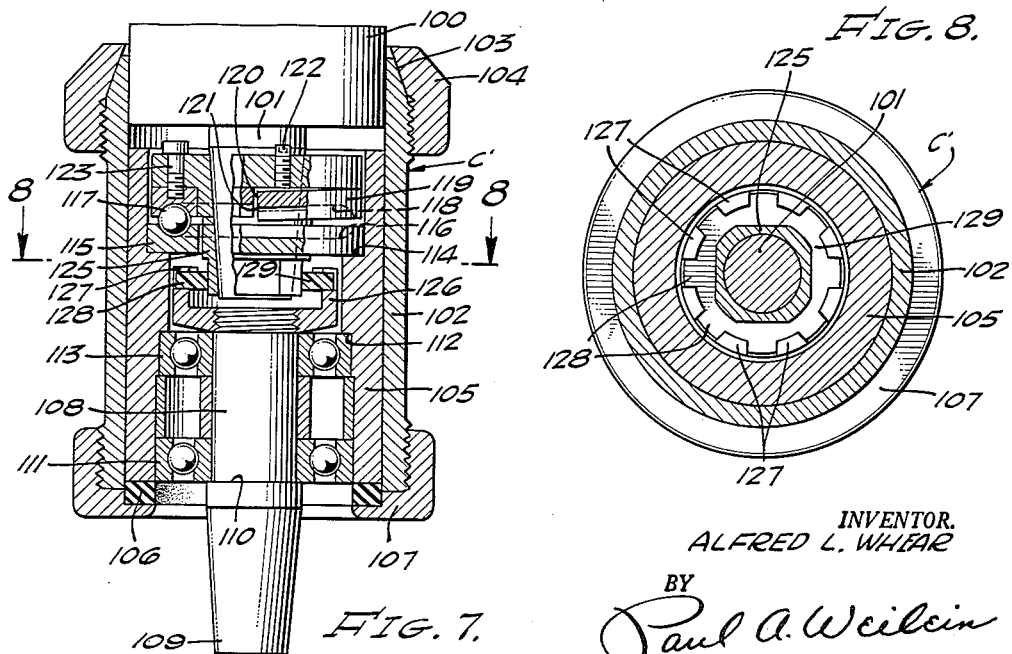
INVENTOR.
ALFRED L. WHEAR
BY
Paul A. Weilein
ATTORNEY May 7, 1963

A. L. WHEAR 3,088,342

CHIP BREAKING COUPLING FOR DRILL SPINDLES

Filed May 31, 1960

INVENTOR.
ALFRED L. WHEAR

BY Paul A. Weilein
ATTORNEY

United States Patent Office 3,088,342
Patented May 7, 1963

3,088,342
CHIP BREAKING COUPLING FOR DRILL
SPINDLES
Alfred L. Whear, Hilton Creek, Calif., assignor to Sierra-Neva Industries, Inc., Torrance, Calif., a corporation of Nevada
Filed May 31, 1960, Ser. No. 32,760
19 Claims. (Cl. 77—32.3)

The present invention relates to drill spindle feed mechanims, and more particularly to a drill spindle coupling which is adapted to effect slight longitudinal movement of the working end of the spindle responsive to rotation of the spindle, whereby to effectively break chips in a hole being drilled.

Efficient drilling of holes in hard modern-day materials such as high tensile strength steels, which have been heat treated to a hardness on the order of 50 to 55 Rockwell C, and new so-called "exotic" tough stringy metals such as titanium, poses problems which have not been solved by the latest developments in high speed steel drills.

The conventional modern-day high speed steel drill is not capable of withstanding high temperatures induced in the drilling of high heat treated and high tensile strength modern-day materials. This is particularly true in the case of small size twist drills in the size range of .046" to .070" in diameter, which small size drills obviously are provided with very limited flute areas for the passage of chip curls from the hole being drilled. Moreover, when drilling some of the modern tough, stringy, exotic metals such as titanium, for example, the chip curls resist breakage and tend to clog the flutes with resultant undesirable additional friction and resistance to turning of the drill bit and consequent excessive temperatures and breakage of the drill.

It is a primary object of the present invention to provide a drill spindle coupling which, responsive to rotation of the spindle, will effect slight longitudinal movement of that portion of the drill spindle lying between the coupling and the work piece being drilled so as to virtually break up the chip curls while at the same time enabling access to the base of the bore of a coolant and lubricant so as to relieve friction.

Another object is to provide a coupling as afore-mentioned which will effect such longitudinal movement of the working end of the drill spindle rapidly and at predetermined intervals. It will be appreciated that the tendency to glaze or work harden the surface of the bore thus adversely affecting the drill cutting edge and causing further resistance to penetration such as would be occasioned by manual intermittent retration of the drill from the hole being drilled, will be avoided by reason of the rapid retraction of the drill in the bore of the work piece being drilled.

In the practical application of the present invention it may be incorporated with facility in a fluid pressure operated drill feed mechanism including a revolvable spindle which is fluid pressure operated for the purpose of feeding the spindle in a drilling direction. In such an application the coupling hereof is combined with the spindle so that it is effectively interposed in the spindle and divides the same into a pair of relatively longitudinally movable spindle sections, one of which is interposed between the coupling and the working end of the spindle.

Alternately, the coupling may be combined with the conventional collet supporting quill of a drilling unit in such a manner that the normal collet supporting spindle constitutes a driving spindle section, and the coupling is provided with a spindle section which is driven and has a projection for the reception of the conventional collet device.

These variations of the practical application of the invention and the foregoing objects and advantages of the invention, as well as other objects and advantages which will become apparent to those skilled in the art, may best be understood from reference to the following detailed description, and the novel features of the invention will be defined in the appended claims.

Referring to the drawings:

FIG. 1 is a diagrammatic view in perspective illustrating a drill table having a fluid pressure operated drill feed device incorporating a spindle coupling made in accordance with the invention;

FIG. 6 is a horizontal sectional view on an enlarged scale as taken on the line 6—6 of FIG. 2;

FIG. 7 is a fragmentary detail view partly in vertical section and partly in elevation of a modified coupling embodying the invention as applied to the conventional quill and spindle of a drilling unit; and FIG. 8 is a horizontal sectional view as taken on the line 8—8 of FIG. 7.

Figure 2:
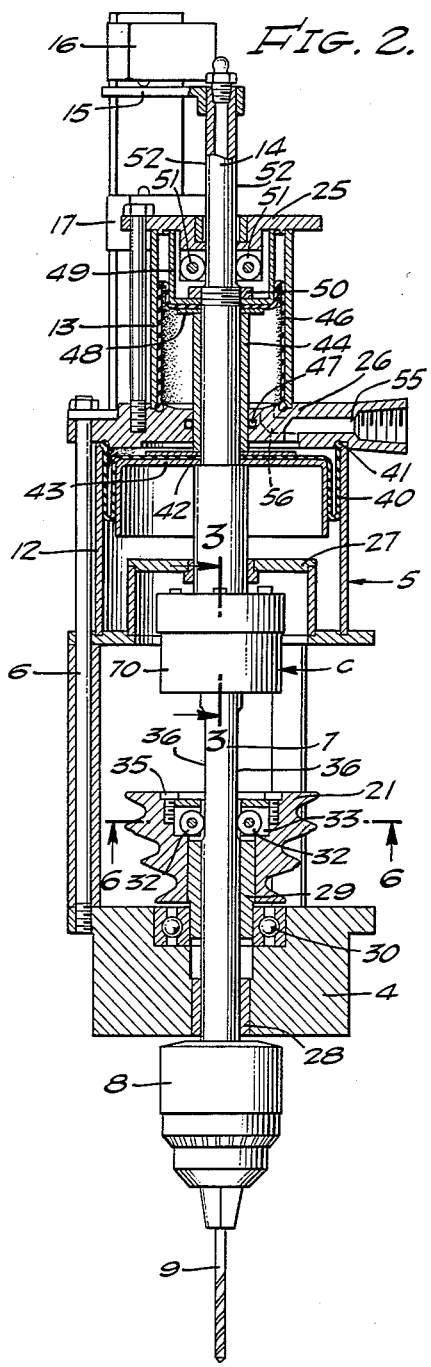
FIG. 2 is an enlarged detailed view in section through the drill feed mechanism as taken on the line 2—2 of FIG. 1.

Referring first to FIGS. 1 and 2, there is illustrated a table type drill support including a supporting base 1, a standard 2 having a work piece supporting table 3 disposed above the base support and above the table and supported by support arm 4, a fluid pressure operated drill spindle feed mechanism generally designated 5 which is supported on the arm 4 by upstanding supports 6. Extending from the feed unit 5 through the support arm 4 is a drill spindle 7 having a chuck or collet 8 thereon for supporting a working stem 9 which in the illustrative embodiment is a twist drill and is movable into engagement with a work piece 10 which by way of illustration is shown as a hex head screw fastener supported in a fixture 11.

The fluid pressure operated spindle feed mechanism includes a lower relatively large diameter spindle feed cylinder 12 and disposed thereabove and designated 13 is a relatively small diameter spindle retracting cylinder. An upward extension 14 on the spindle 7 extends through the top of the cylinder 13 and carries a laterally projecting switch operating arm 15 engageable with an upper microswitch 16 and a lower microswitch 17, which in a manner to be hereinafter described, control the retraction and feed of the spindle 7.

The spindle 7 is driven rotatively by a motor 18 appropriately supported as by a bracket 19 on the standard 2. The motor 18 has a drive pulley 20 connected to a pulley 21 for rotating the spindle 7 through the intermediary of a drive belt 22.

Referring to FIG. 2 it will be noted that the spindle section 14 extends through the top closure plate 25 on the small diameter cylinder 13, thence through an intermediate divider plate 26 interposed between the cylinder 13 and the cylinder 12, thence through the bottom closure 27 of the cylinder 12 and into a coupling generally designated C, which is made in accordance with the invention so as to effect intermittent reciprocation or partial slight retraction of the spindle section 7 which extends from the coupling C downwardly through the drive pulley 21 and support art 4.

As will hereinafter appear, the coupling C will effect, in addition to the slight reciprocation just referred to, gross longitudinal movement of the spindle section C along with the operating section 14 of the spindle, while permitting nonrotation of the spindle section 14 as the section 7 of the spindle rotates. Rotation of the spindle section 7 is effected while permitting longitudinal movement thereof by means of an appropriate sliding drive connection between the pulley 21 and the spindle 7. Spindle 7 is slidably supported in a bushing 28 disposed in a vertically extended opening through the support arm 4. Above the bushing 28 is a rotary bushing 29 journalled in a bearing 30 carried by the support 4. The drive pulley 21 is connected to the bushing 29 in an appropriate manner as by a press fit.

As seen in FIG. 6, cylindrical rollers 32, 32 are mounted in parallel relation in a supporting block 33 on trunnions 34, this block 33 being retained in a recess in the upper end of the pulley 21 by fasteners 35. These rollers 32 are engageable with opposed flats 36 formed on opposite sides of the spindle 7 so that rotation of the pulley 21 will impart rotation to the spindle 7 and consequently the drill 9 through the rollers 32.

Longitudinal feed of the spindle 7 in a drilling direction, i.e., downwardly as viewed in FIG. 2 in the illustrative embodiment, is accomplished by the application of fluid pressure in the feed cylinder 12 at the upper side of a diaphragm designated 40 which is secured at its outer periphery as at 41 at the juncture of the cylinder body with the intermediate plate 26, the diaphragm 40 also being held in sealing relation to the nonrotary spindle section 14 by means of a clamping plate 42 overlying the inner periphery of the diaphragm and sealingly urging the latter into engagement with the upper surface of an inverted diaphragm supporting cup 43. Plate 42 is held in position by a sleeve 44 disposed about the central section of the nonrotatable spindle section 14, this sleeve 44 extending through an opening in the plate 26 and being sealed as by means of an O-ring seal 45.

Above the divider plate 26 the relatively small diameter spindle retracting cylinder is provided with a diaphragm 46 connected at its outer periphery as at 47 with the divider plate 26 and sealingly engaged at its inner periphery by a clamping plate 48 engaged by the sleeve 44, with the inner periphery of the diaphragm 46 clamped between the plate 48 and the bottom of an inverted cup 49 which is pressed towards the upper end of sleeve 44 by a nut 50 threaded on the nonrotatable spindle section 14.

Rotation of the spindle section 14 is prevented by engagement of a pair of rollers 51, 51 of cylindrical form similar to rollers 32 hereinabove described, which are supported by the closure 25 at the top of cylinder 13, and which engage opposed flat sides 52 on the upper end section of the nonrotatable spindle section 14.

Gross reciprocation of the spindle assembly thus far described is effected by the application of fluid pressure as previously noted into either cylinder 12 or cylinder 13, and in this connection it will be noted that the divider plate 26 is provided with a passageway 55 leading into cylinder 12 above the diaphragm 40. Plate 26 is also provided with a passageway 56 leading into the cylinder 13 below the diaphragm 46. Such application of fluid pressure is preferably under the control of a hydropneumatic system as generally illustrated in FIG. 1.

Referring to this view of the drawings, there is a line 55a leading to port 55 from an oil reservoir 57 which may be filled with oil, for example, to the level designated at 58. Leading into the reservoir above the oil level is an air line 59 passing through a solenoid operated valve 60 which is under the control of an appropriate electrical control device generally designated 61. Air under pressure is supplied through the solenoid valve 60 to the reservoir 57 from a supply line 62 which has therein a regulator valve RV1. Similarly, air under pressure from line 62 will pass through a regulator valve RV2 and through line 56a into the small cylinder 13 beneath diaphragm 46. Assuming the drill spindle to be in the position shown in FIG. 2 and the solenoid valve 60 to be open so as to allow the application of air pressure to the oil in reservoir 57, it will be appreciated that oil under pressure will be supplied to the feed cylinder 12 and will act upon the diaphragm 40 to shift the spindle downwardly, compressing air in cylinder 13 which will be relieved through pressure relief valve 65 in line 56a.

When switch operating arm 15 contacts microswitch 17, the control device 61 will be operative to shift solenoid valve 60 so as to bleed air from reservoir 57 to atmosphere so that air pressure passing into cylinder 13 through line 56a will be effective to retract the spindle or move it upwardly until the switch operating arm 15 contacts microswitch 16. As may be preferred for automatic or manual control, energization of microswitch 16 may be effective to actuate solenoid valve 60 so as to again apply air under pressure to the oil in reservoir 57 or actuation of microswitch 16 may be effective simply to halt operation of the apparatus until such time as manual switch 66, as shown on control box 61, is operated to again operate solenoid valve 60. The hydraulic circuitry just referred to is exemplary only, forms no part of the present invention, and therefore need not be described in more specific detail.

As referred to at the commencement hereof, it is among the principal objectives of the invention to provide means whereby the drill 9 will be intermittently reciprocated or elevated slightly in the hole being drilled in the work piece as the drill is being fed downwardly. Accordingly, there is interposed in the spindle between the revolving section 7 and the nonrotating section 14 thereof and in combination therewith, the coupling C, one form of which is shown in particular detail in FIGS. 3-5. In this embodiment the coupling includes a housing or shell 70 threaded as at 71 or otherwise appropriately connected to a radially extended flange 72 at the base of nonrotating spindle section 14. Preferably, the housing is locked against removal from the flange 72 by means of a radially shiftable plastic locking plug 73 disposed in a bore 74 extending radially in the flange 72, the locking plug 73 being engaged by the conical inner extremity 75 of a screw 76 so as to be progressively wedged outwardly into locking engagement with the internal threads of the housing 70. The rotatable spindle section 7 is journalled at its upper end in the housing 70 as by an anti-friction bearing assembly 77 shouldering on an inwardly extending flange 78 at the base of the housing 70 and having an inner race 79 disposed about and engaged with the spindle section 7. The upper extremity of spindle 7 is of reduced diameter and extends into a bushing 80 disposed in an appropriate bore in the lower end of the non-rotating spindle section 14. Formed on or otherwise appropriately supported on the upper end of the spindle 7 is a horizontally extended disklike member 81 which in the illustrative embodiment is keyed as at 82' to the reduced end section of spindle 7 for rotation therewith.

Means are provided resiliently biasing the disk 81 upwardly, and in the illustrative embodiment this means comprises a resilient deformable O-ring 82 engaged at the lower face of the disk 81 and supported in a collar 83 having a shoulder 84 engaging the inner race of antifriction bearing 77. Thus, the bearing 77 which, as here shown, is a thrust bearing, supports the collar against downward movement so as to effectively back up the resilient O-ring 82.

Figure 4:
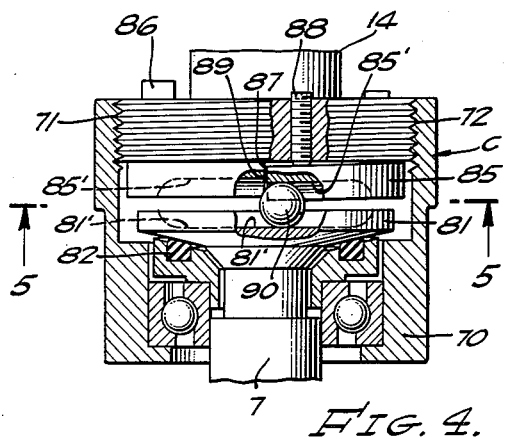
FIG. 4 is a view corresponding to FIG. 3 but with the motion transmitting elements of the coupling shown in partial elevation with parts broken away and shown in section.
Figure 5:
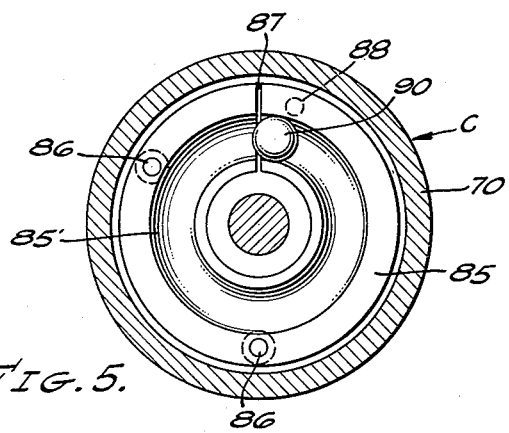
FIG. 5 is a horizontal sectional view as taken on the line 5—5 of FIG. 4.

Opposed to the disk 81 is another disk-like member 85 which is secured to the flange 72 of nonrotating spindle section 14 as by means of a plurality of screw fasteners 86. As seen in FIGS. 4 and 5, the disk member 85 is radially split as at 87 and the fasteners 86 are located one in diametrically spaced relation to the split 87 in the disk 85 and the other to one side of the split 87. The disk 85 is preferably composed of spring steel and is adapted to be partially deformed as by means of an adjustor screw 88 threaded through the flange 72, as shown in FIG. 4, into engagement with the disk 85 adjacent the split 87 so that the disk may be deformed, whereby one side of the disk is angularly inclined or rises progressively longitudinally of the spindle 7 and terminates in an abrupt shoulder 89 at the split 87.

Figure 3:
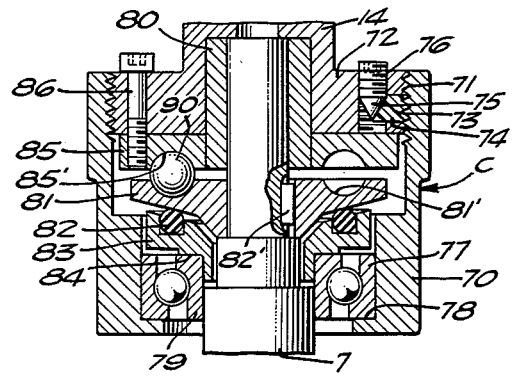
FIG. 3 is an enlarged fragmentary vertical sectional view as taken on the line 3—3 of FIG. 2 and more particularly illustrating the details of the novel coupling of the invention.

A rolling element preferably in the form of a ball 90 is interposed between the disk members 81 and 85 which effectively constitute races for the ball and are provided with arcuate channels or raceways respectively designated 81' and 85'. Accordingly, it is apparent that as the spindle 7 revolves in the direction of the arrow shown in FIGS. 3 and 4, relative to the nonrotating disk 85, the ball will be caused to rotate and travel in the raceways 81' and 85'. As the ball 90 moves from, say, the position shown in FIG. 3 in a circular path between the converging opposed races to the position shown in FIG. 4, the spindle section 7 will be forced downwardly a distance represented by the offset at the shoulder 89 and as illustrated by the axial deformation of the O-ring 82 as shown in FIG. 4, as compared with the relaxed condition of the O-ring 82 as shown in FIG. 3. When the ball 90 passes over the shoulder 89 it will be appreciated that the O-ring 82 will resiliently bias the spindle 7 upwardly abruptly so as to effect slight lifting of the drill 9 from the bore which it is forming in the work piece, resulting in the breaking of any chip curls forming in the flutes of the drill at intervals, each time the ball 90 passes over shoulder 89. Preferably, the length of the circular path of the ball 90 about the axis of the spindle 7 and the rolling periphery of the ball 90 have a ratio of 3:1 whereby the ball 90 will pass over the shoulder 89 once in every three revolutions of the spindle 7, since this has been found to represent the effective length of chip curl which the drill flutes can reasonably handle without clogging and causing burnishing and surface glazing of the material being drilled, with consequent dulling of the cutting edges of the bit and excessive heat generation. It will be recognized, however, that other ratios of length of circular ball races to ball rolling periphery may be availed of if desired. Moreover, in some instances plural balls or rolling elements may be desirable.

Referring now to FIGS. 7 and 8, there is shown a modified construction in which the coupling of the present invention is embodied in an adapter generally designated C' applicable to a quill 100 of a conventional drilling apparatus through which extends a rotary spindle 101. In this embodiment the coupling includes a housing 102 having at its inner end a tapered surface 103 engageable by a tapered nut 104 threaded onto the housing 102 and acting to stress the inner extremity of the shell into frictional supporting engagement with the nonrotating quill 100. An inner shell 105 is slidably disposed within the outer housing 102 and is normally biased inwardly by a resilient ring 106 interposed between the outer extremity of the inner shell 105 and a retainer flange 107 threaded to the outer extremity of the housing 102.

Rotatably disposed in the inner shell 105 is a spindle 108 having a tapered end 109 for the reception of a conventional collet chuck which is of the type ordinarily mounted upon the tapered end of spindle 101. Spindle 108 is provided with a shoulder 110 engaging the inner race of an anti-friction bearing assembly 111 in which the spindle 108 is rotatably mounted within the inner shell 105. In spaced relation to the bearing 111 and shouldering at 112 in the inner shell 105 is a second anti-friction bearing 113. The inner shell 105 is also provided with a shoulder 114 on which is disposed a disk-like member 115 having an annular raceway 116 therein. A ball 117 rides in the raceway 116 and engages in the opposed raceway 118 of a disk-like member 119, which like the member 85 previously described, is preferably composed of spring steel, is split radially as at 120 and deformed to provide a shoulder 121 as by means of an adjustor screw 122. This adjustor screw 122 and securing fastener 123 for the disk 119 extend through a flange 124 of a race supporting member 125 which is mounted in an appropriate manner on the tapered spindle 101 extending from the quill 100.

Means are provided for effecting a rotary drive connection so as to transmit torque from spindle 101 to spindle 108. Preferably, such means comprises a castellated nut 126 threaded on the inner extremity of spindle 108 and having drive lugs 127 spaced circumferentially about its outer periphery, these drive lugs 127 being engaged by radial projections 128 on a drive washer 129. The drive washer 129 is in turn disposed on the outer extremity of member 125 which, as shown in FIG. 8, is preferably of a polygonal cross section. Preferably, the drive washer 129 is composed of nylon or Teflon.

From the foregoing, it will be apparent that rotation of the spindle 101 will be transmitted to spindle 108 as well as to the member 125 and disk member 119 carried thereby, whereby, depending upon the ratio of the length of circular raceways 118 and 116 to the rolling periphery of the ball 117, the inner housing 105 will be moved axially and the ball 117 will ride over shoulder 121 responsive to relative rotation between the spindle 108 and the inner shell 105, so that in this embodiment, as in that previously described, there will be effected an intermittent abrupt axial movement of the drill stem away from the base of the hole being drilled by the bit, under the influence of the resilient element 106 each time the ball 117 passes over the shoulder 121. In this way, the chip curls formed in the drill flutes will be effectively broken and free passage of the broken chip curls through the flutes will be assured. In addition, lubricant and coolant will be better enabled to find access to the base of the bore to maintain the drill cool and well lubricated.

While the specific details of two illustrative embodiments of the invention have been herein shown and described, changes and alterations may be resorted to without departing from the spirit of the invention as defined in the appended claims.

I claim:

1. In a drill spindle feeling mechanism: a rotary spindle; means for urging said spindle axially to effect feed thereof toward a work piece; a coupling in said spindle operable to effect intermittent movement of a portion of the spindle away from said work piece responsive to rotation of said spindle; said coupling including: a rotatable member and a nonrotatable member; rotatable means revolvable in a circular path about the axis of the coupling; one of said members having a surface upon which said rotatable means revolves and converging toward the other member; said one member having a portion subject to deflection to provide on said surface an abrupt shoulder over which said rotatable means passes; and means for deflecting said portion of said one member to provide said abrupt shoulder.

2. In a drill spindle feeding mechanism; a rotary spindle; means for urging said spindle axially to effect feed thereof toward a work piece; a coupling in said spindle operable to effect intermittent movement of a portion of the spindle away from said work piece responsive to rotation of said spindle; said coupling including: a rotatable member and a nonrotatable member; rotatable means revolvable in a circular path about the axis of the coupling; one of said members having a surface upon which said rotatable means revolves and converging toward the other member; said one member having a deformable portion; means operable for maintaining said deformable portion in a position providing an abrupt shoulder over which said rotatable means passes; and means resiliently biasing said members toward one another.

3. In a drill spindle feeding mechanism: a rotary spindle; means for urging said spindle axially to effect feed thereof toward a work piece; a coupling in said spindle operable to effect intermittent movement of a portion of the spindle away from said work piece responsive to rotation of said spindle; said coupling including: a rotatable member and a nonrotatable member; rotatable means revolvable in a circular path about the axis of the coupling; one of said members having a surface upon which said rotatable means revolves and converging toward the other member; said one member having a resilient portion subject to deflection to provide an abrupt shoulder; and means for holding said portion in deflected position to form said shoulder; said surface commencing and terminating at said abrupt shoulder over which latter said rotatable means passes.

4. In a drill spindle feeding mechanism: a rotary spindle; means for urging said spindle axially to effect feed thereof toward a work piece; a coupling in said spindle operable to effect intermittent movement of a portion of the spindle away from said work piece responsive to rotation of said spindle; said coupling including: a rotatable member and a nonrotatable member; rotatable means revolvable in a circular path about the axis of the coupling; one of said members having a surface upon which said rotatable means revolves and converging toward the other member; said surface commencing and terminating at an abrupt shoulder over which said rotatable means passes; the length of said path and the rolling periphery of said rotatable means having a ratoo of 3:1; said one member being split across said surface; and means operable to deflect said one member adjacent said split to provide and maintain said shoulder on said surface.

5. In a drill spindle feeding mechanism: a rotary spindle; means for urging said spindle axially to effect feed thereof toward a work piece; a coupling in said spindle operable to effect intermittent movement of a portion of the spindle away from said work piece responsive to rotation of said spindle; said coupling including: a rotatable member and a nonrotatable member; said members having opposed faces extended normal to the axis of said spindle; one of said faces having a circumferentially extended recess the base of which rises progressively longitudinally of said spindle and terminates in a shoulder; the member having said recess being provided with a resilient depressible portion extending across said recess; means deflecting said resilient portion to provide said shoulder; and a ball revolvable in said recess and frictionally engaging the other of said faces.

6. In a drill spindle feeding mechanism comprising: a rotary spindle; means for urging said spindle axially to effect feed of said spindle toward a work piece; a coupling in said spindle including a pair of races; means connecting the respective races respectively to relatively axially movable portions of said spindle; one of said races having a surface progressively leading longitudinally toward the other of said races; means including a split portion of said one race defining a shoulder interrupting said surface; and a revolvable element riding between said races in engagement with said surface.

7. In a drill spindle feeding mechanism comprising: a rotary spindle; means for urging said spindle axially to effect feed of said spindle toward a work piece; a coupling in said spindle including a pair of races; means connecting the races respectively to relatively axially movable portions of said spindle; one of said races having a surface progressively leading longitudinally toward the other of said races; means including a risilient split portion of said one race providing a shoulder interrupting said surface; a revolvable element riding between said races in engagement with said surface; the other of said races being rigidly supported on the other of said spindle portions; and means resiliently urging said other of said spindle portions in a direction to urge said races toward one another.

8. A coupling for effecting relative axial movement between a pair of relatively rotatable members, comprising: a rotatable coupling element carried by one of said members; another coupling element carried by the other of said members; said coupling elements having opposed surfaces; a rolling element frictionally disposed between said opposed surfaces; one of said surfaces progressively extending longitudinally of said coupling and terminating in a shoulder; an annular member in direct contact with one of said coupling members for resiliently biasing said coupling elements toward one another; an anti-friction thrust bearing for one of said rotatable members; means supporting said anti-friction thrust bearing; a collar seated on said thrust bearing between one of said coupling elements and said thrust bearing and supporting said annular member.

9. A coupling for effecting relative axial movement between a pair of relatively rotatable members comprising: a pair of disk-like elements carried by said members and opposed to one another; one of said disk-like members having a resilient annular race carried thereby; said race being radially split; means securing said race to the disk-like member; means deflecting a portion of said race away from its disk-like member; and a revolving motion transmitting member riding between said race and the opposed disk-like member.

10. A device of the class described comprising: a pair of relatively rotatable and axially movable members; a hollow body connected to one of said members; a part rotatably disposed in said body and connected with the other member; an annular element of elastomeric material interposed between a portion of said body and said rotatable part in surrounding relation to said other member for resiliently urging said body and said part relatively axially in one direction; means for intermittently urging said body and said part relatively axially in the other direction responsive to relative rotation of said members, an anti-friction thrust bearing carried by said portion of said body; and a collar supported by said bearing and holding said annular element against said rotatable part.

11. A device of the class described comprising: a pair of relatively rotatable and axially movable members; a hollow body connected to one of said members; a part rotatably disposed in said body and connected with the other member; means resiliently urging said body and said part relatively axially in one direction including a member of elastomeric material; means for intermittently urging said body and said part relatively axially in the other direction responsive to relative rotation of said members; said last-mentioned means comprising opposed raceways having converging surfaces extending circumferentially; a rolling element interposed between said surfaces; one of said surfaces terminating in an abrupt shoulder over which said rolling element passes; a thrust bearing for one of said rotatable and axially movable members carried by said hollow body; and a collar seated on a part of said bearing and supporting said member of elastomeric material against said rotatable part.

12. A device of the class described comprising: a pair of relatively rotatable and axially movable members; a hollow body connected to one of said members; a part rotatably disposed in said body and connected with the other member; means resiliently urging said body and said part relatively axially in one direction; means for intermittently urging said body and said part relatively axially in the other direction responsive to relative rotation of said members; said last-mentioned means comprising an annular washer having a radial split; means deflecting said washer at one side of said split; and a rolling element riding on said washer.

13. A motion transmitting device comprising: a pair of aligned relatively rotatable members; a housing carried by one of said members; a pair of opposed disk-like elements in said housing connected respectively to said housing and to the other of said members; a rolling element between said disk-like elements; an annular element of elastomeric material surrounding one of said rotatable members and engaged with one of said disk-like elements for resiliently biasing said disk-like elements toward one another with said rolling element engaged therebetween and movable in a circular path; one of said disk-like elements having a surface projecting toward the other rolling element and disposed in the path of said rolling element; an anti-friction thrust bearing for one of said relatively rotatable members carried by said body; said anti-friction bearing having an inner race; and an annular collar seated on said inner race and holding said annular elastomeric element against said one of said disk-like elements.

14. A motion transmitting device comprising: a pair of aligned relatively rotatable members; a housing carried by one of said members; a disk-like member carried by the other of said members and disposed in said housing; resilient means interposed between one end of said housing and said disk-like member for biasing the latter toward the other end of said housing; an annular washer at said other end of said housing and having a radial split; means securing a portion of said washer to said housing; means deflecting another portion of said washer adjacent said split toward said disk-like member; and a revolving member interposed between said washer and said disk-like member and revolvable in a circular path over said split.

15. A motion transmitting device comprising: a pair of members disposed coaxially one within the other for relative rotation; a housing connected to one of said members; a hollow shell slidable on and guided by the inner surface of said housing; an elastomeric ring resiliently biasing said shell toward said one member; a disk-like element on the other of said members; a disk-like element in said hollow shell opposed to the first-mentioned disk-like element; one of said disk-like elements having a surface projecting toward the other disk-like element; and a rolling element engaged between said disk-like elements for movement in a revolving path over said surface.

16. A motion transmitting device comprising: a pair of members disposed coaxially one within the other for relative rotation; a housing connected to one of said members; a hollow shell slidable on and guided by the inner surface of said housing; means interposed between an end of said housing and an end of said shell for resiliently biasing said shell toward said one member; a disk-like element on the other of said members; a disk-like element in said hollow shell opposed to the first-mentioned disk-like element; one of said disk-like elements having a surface projecting toward the other disk-like element; a rolling element engaged between said disk-like elements for movement in a revolving path over said surface; a driven element journalled in said shell and extending from said housing; and means connecting said driven element to one of said members.

17. A motion transmitting device comprising: a pair of members disposed coaxially one within the other for relative rotation; a housing connected to one of said members; a shell slidable in said housing; means resiliently biasing said shell toward said one member; a disk-like element on the other of said members; a disk-like element in said shell opposed to the first-mentioned disk-like element; one of said disk-like elements having a surface projecting toward the other disk-like member; a rolling element engaged between said disk-like elements for movement in a revolving path over said surface; a driven element extending from said housing; means connecting said driven element to one of said members; connecting means including a drive washer having a polygonal periphery; said last-mentioned member having a polygonal surface mating with the polygonal surface of said washer; the other periphery of said washer having a projection therein; and a drive coupling engaged with said projection and connecting said washer to the other of said members.

18. A coupling for a drill spindle comprising: an axially extended housing having a closure at one end and opened at the other end; an anti-friction thrust bearing in the opened end of said housing; said bearing having an inner race provided with a central opening; a spindle extending through said opening in said race into said housing; a bearing in said housing closure; said spindle having its inner extremity journalled in said bearing; means providing on said housing closure within said housing a circular track having an abrupt shoulder; said track having a base rising progressively longitudinally of said spindle and terminating at said shoulder; an annular seat in said housing supported on said thrust bearing race; a disc fixedly mounted upon said spindle between said seat and said means providing said track; said disc having a track opposing said first mentioned track; a rolling element engaged in the respective tracks; and resiliently deformable means interposed between and engaged with said disc and said seat for biasing said disc and rolling element toward said housing enclosure.

19. A drill spindle coupling comprising: an axially extended housing having means at one end for connection to the quill of a drilling device from which projects a rotary drill spindle; an inner shell axially shiftably disposed in said housing; a second spindle having an end disposed in said housing and projecting therefrom; means journalling said second spindle in said shell; means in said shell for connection to said spindle projecting from said quill and engaged with said shell and with said second spindle for driving said second spindle and for imparting to said shell axial motion in one direction; and resilient means interengaged with said housing and said shell for biasing said shell in the other direction.

References Cited in the file of this patent

UNITED STATES PATENTS

| | | |
|---|---|---|
| 2,430,019 | Jenkins | Nov. 4, 1947 |
| 2,474,720 | Billeter | June 28, 1949 |
| 2,514,758 | Hallden | July 11, 1950 |
| 2,581,311 | Taylor | Jan. 1, 1952 |
| 2,630,723 | Gridley | Mar. 10, 1953 |